J. A. CARLSON.
WRENCH.
APPLICATION FILED JAN. 17, 1911.

993,504.

Patented May 30, 1911.

WITNESSES:
Louis Lucia.
Margaret E. O'Neill

INVENTOR.
John A. Carlson.
BY
Arthur B. Jenkins,
ATTORNEY.

THE NORRIS PETERS CO., WASHINGTON, D. C.

UNITED STATES PATENT OFFICE.

JOHN A. CARLSON, OF HARTFORD, CONNECTICUT.

WRENCH.

993,504.                        Specification of Letters Patent.        Patented May 30, 1911.

Application filed January 17, 1911. Serial No. 603,068.

*To all whom it may concern:*

Be it known that I, JOHN A. CARLSON, a subject of the King of Sweden, and residing at Hartford, in the county of Hartford and State of Connecticut, have invented a new and Improved Wrench, of which the following is a specification.

My improvement relates to the class of wrenches the jaws of which may be positioned to fit articles of different size, and the object of my invention, among others, is to provide a device of this class in which the jaws may be readily placed and securely held when so placed.
One form of device embodying my invention, and in the use of which the objects above set out may be attained, is illustrated in the accompanying drawings, in which—

Figure 2:
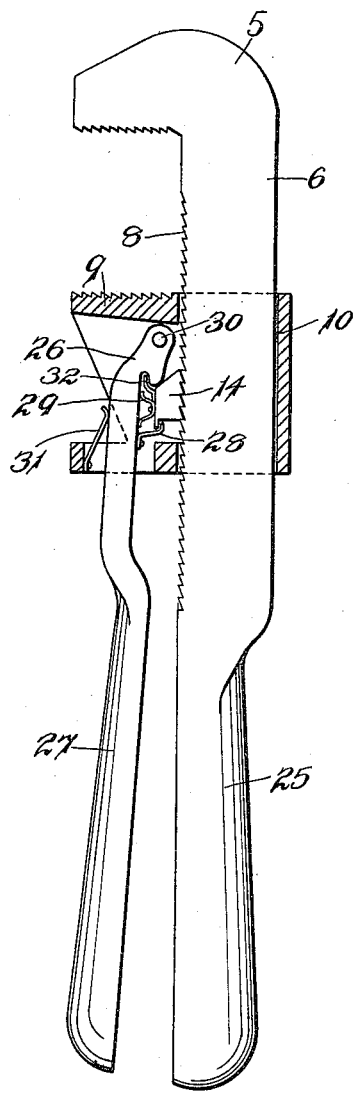
Figure 1:
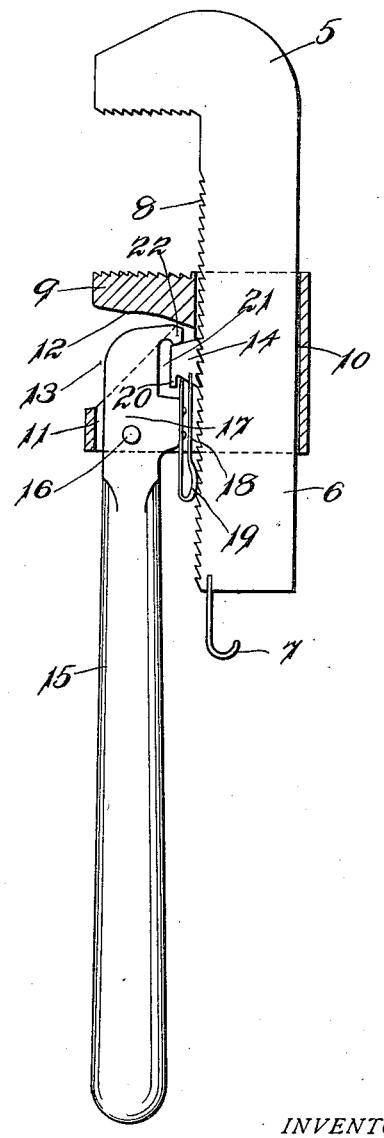

Figure 1 is a side view partially in section, of a wrench embodying my invention, the handle being shown in its mid-position. Fig. 2 is a like view of a wrench embodying a slightly different form of construction from that shown in Fig. 1.
In the accompanying drawings the numeral 5 denotes the fixed jaw, 6 the shank thereof and 7 a hand grip by means of which the tool is held while the jaw is being adjusted to any desired position. The shank is provided along its inner edge with teeth 8.

A movable jaw 9 is mounted on the shank 6, a shank opening 10 extending through the jaw, and in which opening the shank 6 is located for lengthwise movement. This opening 10 is enlarged to provide a recess 11 at one side thereof, this recess having a beveled wall 12 at what I term its front edge. The jaw is open into said recess as shown at 13 in the preferred form of construction, the beveled wall 12 forming one wall of this opening which is in fact coincident with the wall of the recess.

A dog 14 is located within the recess 11, this dog having teeth to correspond and mesh with the teeth on the shank 6. A handle 15 is pivotally secured to the jaw 9 as by means of a pivot 16 located within the recess in the jaw. This handle is formed at its inner end into a head 17, to which head the dog 14 is movably attached, as by means of a dog support 18. In the preferred form of construction, and as shown herein, this dog support is in the form of a spring bent to approximately U-shape, with the bowed portion 19 adapted to rest against and slide upon the teeth 8, one branch of the spring being secured to the dog at its end and the other branch being secured to the head 17. The dog has a lip 20 at one edge, the projecting end of that part of the spring secured to the head underlying this lip and holding the dog in place in the mouth 21 of the head 17. A nose 22 is formed at the end of the head 17 and is preferably beveled to fit within the tapered space between the beveled wall 12 and the beveled edge of the dog 14, although it is not absolutely necessary that this nose shall be beveled so long as means are provided to cause the jaw 9 to be forced toward the jaw 5 as the nose is thrust between the dog 14 and the jaw 9 in the operation of the device. It will be noted that the dog 14 is loosely carried by the head 17, the support 18 allowing the dog movement toward and from the head and also to a limited extent in a direction lengthwise of the head.

In the operation of the device the handle being moved to the right in the device shown in Fig. 1, while the shank 6 is held, the nose 22 is moved within the tapered recess and the dog 14 is disengaged from the teeth 8 so that the jaw 9 may be moved up into contact with the article to be gripped, the opposite side of the article of course resting against the jaw 5. By moving the handle in the opposite direction or toward the left, the dog 14 will be seated within the teeth 8, at which time it may be found that the article is somewhat loosely clamped between the jaws. If force be now applied to the handle 15 to move it toward the left the nose 22 will be forced into the tapered recess between the jaw 9 and the dog 14, and by reason of the looseness between the jaw and the dog the former is allowed to move lengthwise and tightly grip the article between the jaws, and the more force applied to the handle 15 the tighter will be the grip of the jaws.

In the form of device shown in Fig. 2 the shank 6 is extended to form a handle 25. The teeth are formed for engagement of the dog 14 as shown in said figure, and the dog is loosely supported by a head 26 at the end of a handle 27, the dog being located within a mouth one wall of which is formed by a clip 28 underlying the lip, and a spring 29 is secured to the dog and thrusts against the wall at the back of the mouth. In this form of device the handle 27 is pivotally attached as at 30 to the jaw 9, the location of the pivot being on the opposite side of the dog 14 from that shown in Fig. 1. A spring 31 forces the handle 27 toward the handle 25.

The action of the parts is substantially the same in both structures with the exception that in the device of Fig. 2 the two handles are forced together and the pressure upon the dog 14 is resisted by the pivot 30 instead of by the wall of the recess as shown in Fig. 1. The dog 14 in this construction is held against separation from the head 26 by a spring finger 32 secured to the dog and projecting into a recess in the head as shown in Fig. 2, this spring finger yielding to allow the handle 27 sufficient movement toward the handle 25 to secure full clamping action between the jaws.

The form of construction herein shown and described may be departed from to a greater or lesser extent without avoiding the spirit and intent of the invention, and the latter is therefore not limited to the exact construction herein shown and described.

I claim:—

1. A fixed jaw having a shank, a jaw movably supported on said shank, a handle pivotally secured to the loose jaw, a dog loosely supported by the handle, interengaging means upon the dog and shank, and means for forcing the movable jaw toward the fixed jaw independently of movement of the dog.

2. A fixed jaw having a shank, teeth located on the edge of said shank, a movable jaw slidably mounted on the shank, a handle pivotally secured to the movable jaw, a dog loosely supported by the handle and having teeth to engage the teeth on the shank, and means for moving the movable jaw independently of movement of said dog.

3. A fixed jaw having a shank, a jaw movably mounted thereon, a handle pivotally secured to the jaw, a dog loosely supported by the handle, interengaging means between the shank and dog, and a wedge shaped recess between the dog and jaw to receive a nose from the handle.

4. A fixed jaw having a shank, a jaw movably mounted thereon, a handle pivotally mounted on the jaw and having a mouth, a dog loosely supported within said mouth, a resilient connection between the dog and handle and means for forcing the movable jaw away from the dog by the swinging movement of the handle.

5. A fixed jaw having a shank, a jaw movably mounted thereon, a handle pivotally secured to the movable jaw and having a mouth, a dog having a lip located in said mouth to retain the dog therein, means for resiliently connecting the dog to the handle, and a wedge shaped recess to receive a projection from the handle to force the movable jaw away from the dog.

6. A fixed jaw having a shank, a jaw movably mounted thereon and having a recess, a handle pivotally mounted in said recess and having a nose, a dog loosely supported by the handle with a wedge shaped space between the dog and a wall of the recess, means for loosely supporting the dog on the handle, and a projection from the handle arranged to enter said wedge shaped space.

7. A fixed jaw with a shank projecting therefrom, a jaw movably supported thereon and having a recess, a handle pivotally supported in said recess, a mouth located on the handle at one side of said pivot whereby swinging movement of the handle carries the mouth away from said shank, a dog loosely supported in said mouth, interengaging means between the dog and shank, a wedge shaped space between the movable jaw and dog, and a projection from the handle adapted to enter said space to move it away from the dog.

JOHN A. CARLSON.

Witnesses:
ARTHUR B. JENKINS,
EVA L. STOUGHTON.

---

Copies of this patent may be obtained for five cents each, by addressing the "Commissioner of Patents, Washington, D. C."